United States Patent
Xie et al.

(10) Patent No.: US 10,360,182 B2
(45) Date of Patent: Jul. 23, 2019

(54) RECOVERING DATA LOST IN DATA DE-DUPLICATION SYSTEM

(71) Applicant: EMC Corporation, Hopkinton, MA (US)

(72) Inventors: Ying Xie, Cupertino, CA (US); Curtis Christian Anderson, Saratoga, CA (US); Nitin Garg, Sunnyvale, CA (US); Dheer Moghe, Sunnyvale, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/157,099

(22) Filed: May 17, 2016

(65) Prior Publication Data

US 2016/0328413 A1    Nov. 10, 2016

Related U.S. Application Data

(63) Continuation of application No. 13/332,132, filed on Dec. 20, 2011, now Pat. No. 9,367,397.

(51) Int. Cl.

| | | |
|---|---|---|
| *G06F 12/00* | (2006.01) | |
| *G06F 17/30* | (2006.01) | |
| *G06F 16/16* | (2019.01) | |
| *G06F 11/14* | (2006.01) | |
| *G06F 16/11* | (2019.01) | |
| *G06F 16/17* | (2019.01) | |
| *G06F 16/174* | (2019.01) | |
| *G06F 16/2455* | (2019.01) | |
| *G06F 3/06* | (2006.01) | |
| *G06F 12/02* | (2006.01) | |

(52) U.S. Cl.
CPC ........... *G06F 16/162* (2019.01); *G06F 3/0608* (2013.01); *G06F 3/0652* (2013.01); *G06F 3/0683* (2013.01); *G06F 11/1402* (2013.01); *G06F 12/0261* (2013.01); *G06F 16/11* (2019.01); *G06F 16/1724* (2019.01); *G06F 16/1727* (2019.01); *G06F 16/1748* (2019.01); *G06F 16/24565* (2019.01); *G06F 3/0641* (2013.01); *G06F 11/1435* (2013.01)

(58) Field of Classification Search
CPC ................ G06F 17/30135; G06F 17/30156
USPC .................................................. 707/814, 820
See application file for complete search history.

(56) References Cited

U.S. PATENT DOCUMENTS

| | | | | |
|---|---|---|---|---|
| 5,664,126 A | * | 9/1997 | Hirakawa | H04L 29/12009 707/999.01 |
| 6,029,160 A | * | 2/2000 | Cabrera | G06F 21/6227 707/E17.01 |
| 6,073,142 A | * | 6/2000 | Geiger | G06Q 10/107 709/204 |
| 6,192,370 B1 | * | 2/2001 | Primsch | G06F 16/289 707/999.202 |
| 6,865,584 B2 | | 3/2005 | Oksanen | |
| 7,165,158 B1 | | 1/2007 | Yagawa | |
| 7,526,768 B2 | * | 4/2009 | Schleifer | G06F 16/275 719/310 |

(Continued)

*Primary Examiner* — Pavan Mamillapalli
(74) *Attorney, Agent, or Firm* — Womble Bond Dickinson (US) LLP

(57) ABSTRACT

An indication is received that a data object is to be deleted, wherein the data object comprises data stored in a segment within a container. It is determined no currently alive data object references any segment within the container. The container is placed in a delete-ready but not yet reclaimable state.

20 Claims, 10 Drawing Sheets

(56) References Cited

U.S. PATENT DOCUMENTS

| | | |
|---|---|---|
| 7,584,338 B1 * | 9/2009 | Bricker .............. G06F 17/30212 |
| | | 707/999.202 |
| 8,176,269 B2 | 5/2012 | Jaquette |
| 8,191,044 B1 * | 5/2012 | Berlik .................. G06F 11/3672 |
| | | 717/102 |
| 8,224,875 B1 * | 7/2012 | Christiaens ........... G06F 16/215 |
| | | 707/813 |
| 8,285,758 B1 | 10/2012 | Bono et al. |
| 8,301,671 B1 * | 10/2012 | Greenwood ........ G06F 11/2094 |
| | | 707/813 |
| 8,307,176 B1 * | 11/2012 | Wu ..................... G06F 11/1448 |
| | | 707/640 |
| 2005/0055492 A1 * | 3/2005 | Muthulingam ....... G06F 3/0608 |
| | | 711/100 |
| 2005/0108296 A1 | 5/2005 | Nakamura |
| 2005/0216665 A1 | 9/2005 | Takakuwa |
| 2007/0027940 A1 | 2/2007 | Lutz |
| 2008/0114962 A1 | 5/2008 | Holt |
| 2009/0254594 A1 | 10/2009 | Burchall |
| 2010/0199027 A1 * | 8/2010 | Pucheral ............. G06F 16/9014 |
| | | 711/103 |
| 2012/0023072 A1 | 1/2012 | Garg |
| 2012/0059800 A1 | 3/2012 | Guo |
| 2013/0086131 A1 * | 4/2013 | Hunt ................... G06F 12/0276 |
| | | 707/819 |
| 2013/0086132 A1 * | 4/2013 | Hunt ................... G06F 12/0253 |
| | | 707/819 |
| 2015/0310025 A1 * | 10/2015 | Rathgeber ............. G06F 16/125 |
| | | 707/662 |

\* cited by examiner

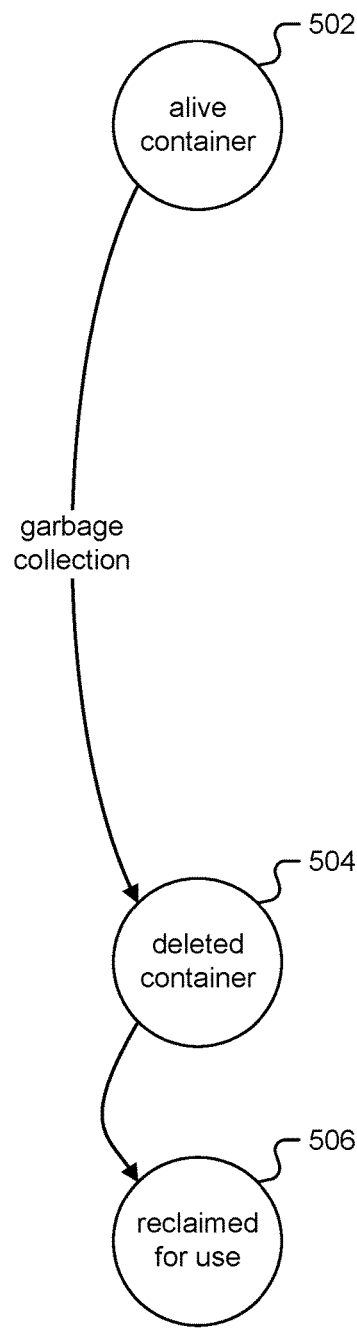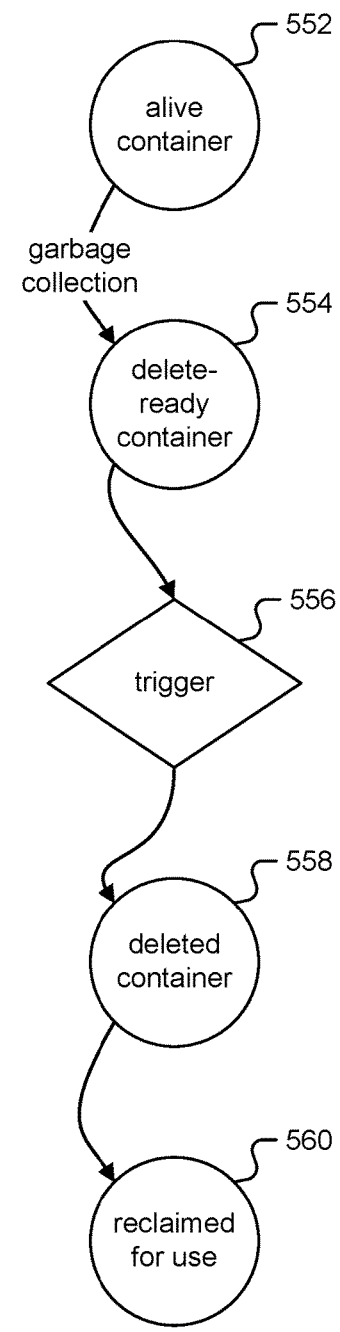
FIG. 5A
FIG. 5B

RECOVERING DATA LOST IN DATA
DE-DUPLICATION SYSTEM

CROSS REFERENCE TO OTHER
APPLICATIONS

This application is a continuation of co-pending U.S. patent application Ser. No. 13/332,132, entitled RECOVERING DATA LOST IN DATA DE-DUPLICATION SYSTEM, filed Dec. 20, 2011, which is incorporated herein by reference for all purposes.

BACKGROUND OF THE INVENTION

In a deduplicating system, data is broken up into segments, and if the segment is already stored on the system, a reference to the already-stored segment is stored instead of storing the segment again. Segments may be stored in containers as the unit of storage in the system, and may be stored immutably as each segment is unique in the deduplicating system.

Garbage collection in a deduplicating system comprises determining and/or reorganizing containers that have few or no references to alive segments to reclaim disk space for the deduplicating system. Throughout this specification "alive" data refers to data being actively used/stored by a user, system and/or administrator. Deleted data refers to data no longer being referenced/wanted by said user, system and/or administrator.

There exists a need to reclaim the disk space through garbage collection efficiently.

BRIEF DESCRIPTION OF THE DRAWINGS

Various embodiments of the invention are disclosed in the following detailed description and the accompanying drawings.

FIGS. 5A and 5B are flow diagrams illustrating embodiments of container states.

DETAILED DESCRIPTION

Figure 1:
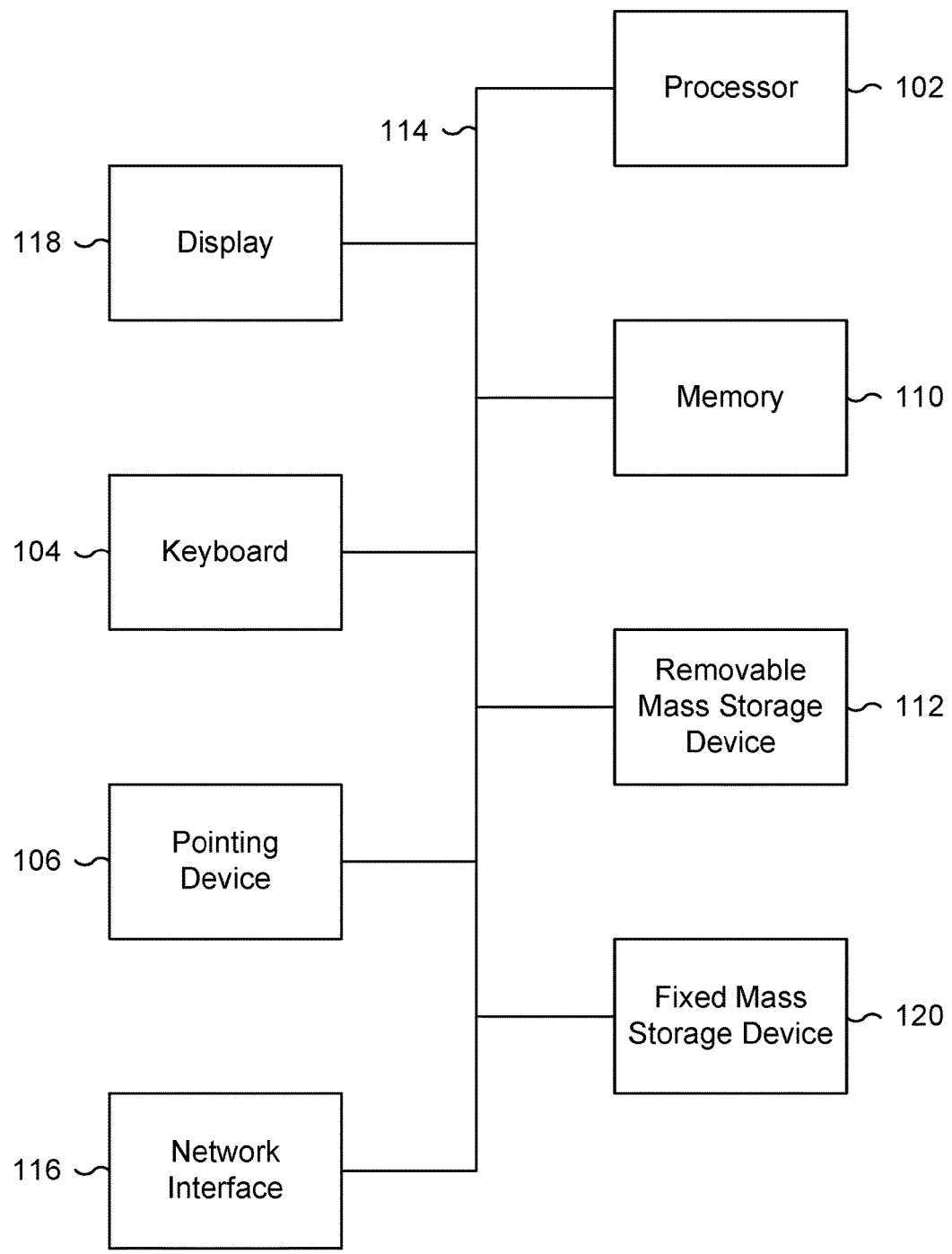
FIG. 1 is a functional diagram illustrating a programmed computer system for data recovery in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In a data duplication system, hardware and software problems and/or bugs may cause the system to lose disk blocks and data accidentally. Redundant array of independent/inexpensive disks ("RAID"), data checksums and data verification are implemented to reduce this loss, but operator error and/or bugs in the code leads to corrupting disk blocks, or deleting data that should not have been deleted. Prior data duplication systems may include a container manager that after garbage collection puts containers with unreferenced segments in a delete state for reclamation. Other data duplication systems may reclaim the containers/disk space in an arbitrary sequence, and data duplication systems exist that reclaim the containers inadvertently in a Last-In First-Out ("LIFO") sequence such that the last container to be put in a delete state is the first container to be physically deleted and/or reclaimed. A LIFO sequence is unhelpful for a user, system or administrator because it is often the last container put in a delete state that has the most relevant data that may have been accidentally deleted or in error.

Recovering data is disclosed, comprising introducing a state to containers termed "delete-ready". When garbage collection deletes a container, instead of being deleted or put into a delete state, it is placed instead in a delete-ready state. When free space is available, for example unused containers, a container manager will consume unused containers first. When the container manager runs out of unused containers, to allocate more new containers, it takes the oldest or near-oldest delete-ready containers, marks them as deleted, and reuses them for space. Containers in the delete-ready state remain in the index, so that (unreferenced) data within the delete-ready containers can still be recovered using a segment fingerprint as a key.

FIG. 1 is a functional diagram illustrating a programmed computer system for data recovery in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem (also referred to as a processor or a central processing unit (CPU)) 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118).

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
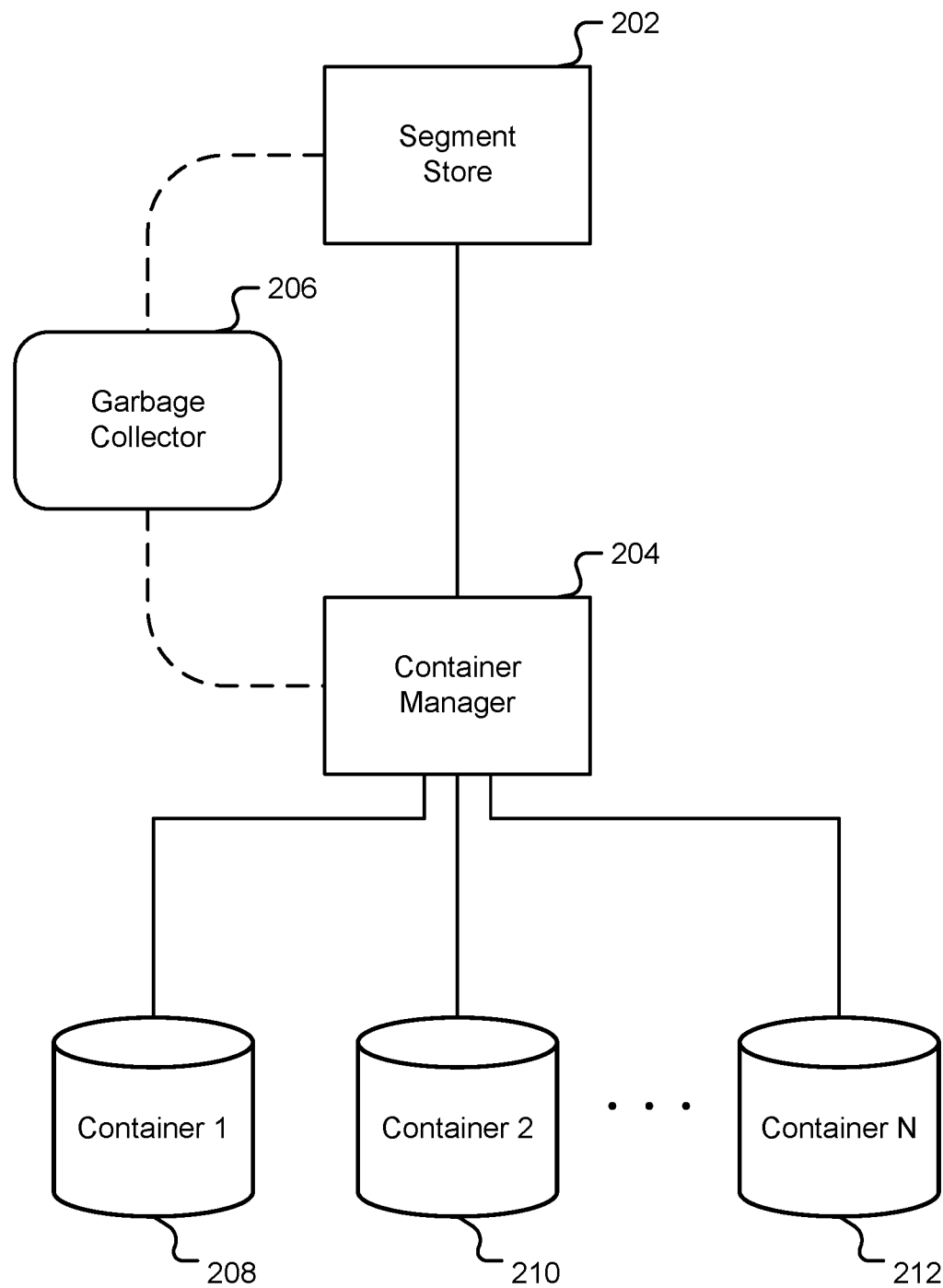
FIG. 2 is a block diagram illustrating an embodiment of a system for recovering data.

FIG. 2 is a block diagram illustrating an embodiment of a system for recovering data. In some embodiments, the system in FIG. 2 may wholly or in part be implemented by one or more systems shown in FIG. 1. In the example shown, segment store (202) is coupled with container manager (204). Garbage collector (206) is coupled periodically with segment store (202) and container manager (204). Containers (208), (210) and (212) are coupled to container manager (204). Segment store (202) deduplicates data divided into segments based on a segment "fingerprint", wherein throughout this specification a fingerprint refers to a digital signature (also referred to as a cryptographic hash) that is generated from the result of a hash function of all or a portion of the segment data, a Rabin fingerprint, a sequential number assigned by the system, or any other appropriate identifier. In some embodiments, a cryptographic hash function such as the MD5 algorithm is used to generate a fingerprint. In some embodiments, the fingerprint for a segment in a segment list is grouped in stream order, for example in containers. In some embodiments, segments are in principal uniquely identified by their fingerprint and immutable, such that once a segment is stored in a container it cannot be modified once written.

Container manager (204) takes the segments indexed by the system and/or segment store (202) and stores them in containers (208), (210) and (212). In some embodiments, containers are immutable, such that new containers can be appended, but containers cannot be modified once written, and are assigned container identifiers unique for the life of the system. That is, once container "2" (210) is deleted, no other container will be assigned an identifier "2". A mapping is stored between an alive file, alive segment/fingerprint and an alive container for reference in writing/reading data. Without loss of generality, containers may be assigned identifiers in order, for example an increasing numeric order, such that we may determine either by the identifier itself or by other means that container 1 is older than container 1001.

Garbage collection subsystem, or garbage collector (206) is initiated on a periodic basis, for example a weekly basis (e.g. a weekend) or in the middle of the night, to reclaim space from containers. Space in containers may be freed when files are deleted, resulting in some or all of the space in a container to be not referenced by any alive file. In some embodiments the garbage collector (206) uses a mark and sweep strategy and goes through every file on the system and mark in a Bloom filter every segment that is referenced; garbage collector (206) then goes through every alive container and for each segment requests from the bloom filter if the segment is referenced by any file. Any segment unreferenced by any file is effectively dead and can be deleted from the system, and its space reclaimed.

Figure 3:
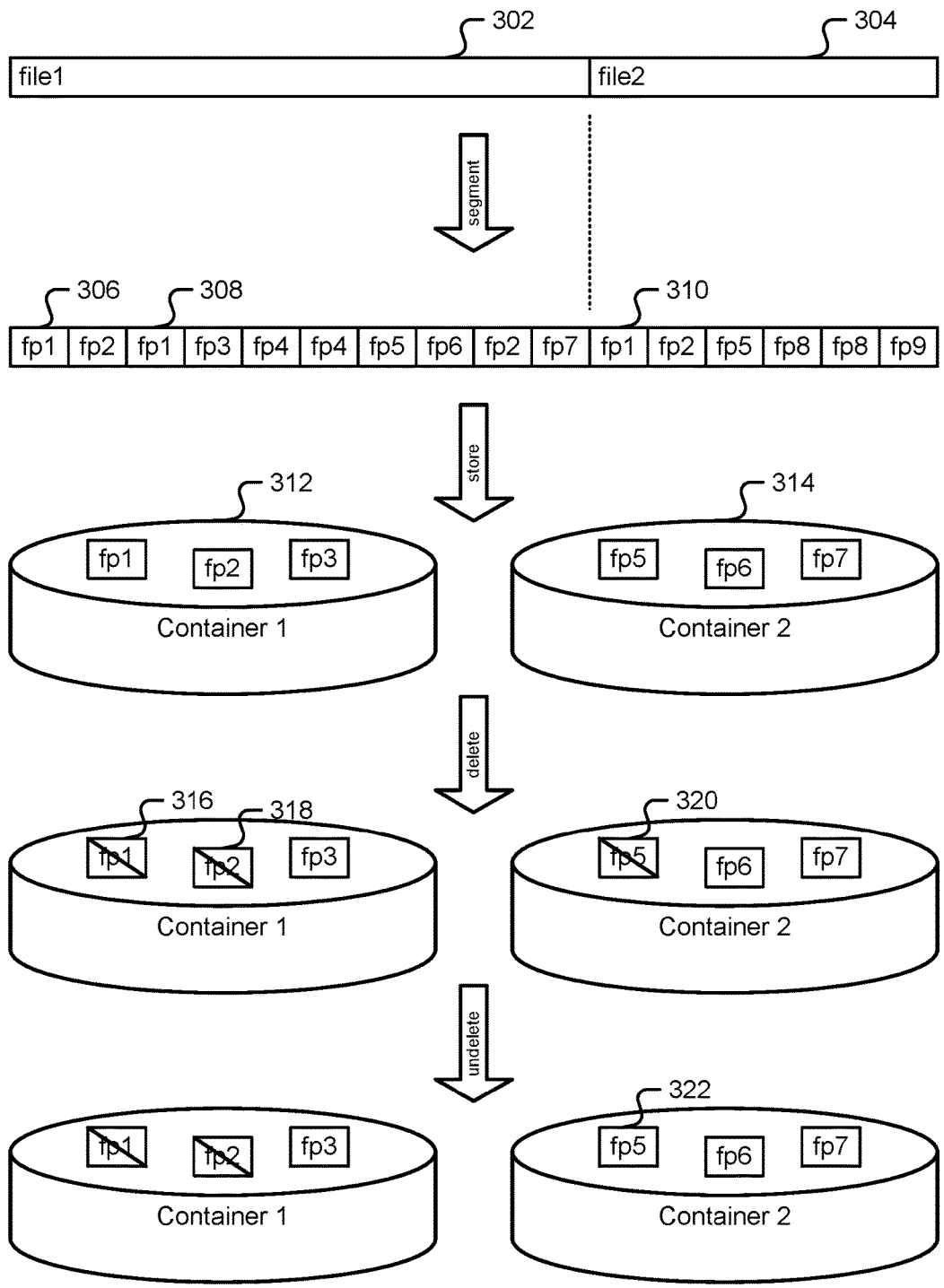
FIG. 3 is a diagram illustrating an embodiment of a process for deleting and undeleting segments.

FIG. 3 is a diagram illustrating an embodiment of a process for deleting and undeleting segments. In some embodiments, the process in FIG. 3 may be established by the system in FIG. 2.

Within the file system, for example two files named "file1" (302) and "file2" (304) are stored in the system. The system segments the files into unique (and deduplicated) segments, one shown for example with fingerprint "fp1". After segmentation, as shown, segment with fingerprint fp1 occurs twice in file1, once at the first segment position (306) and once at the third segment position (308), and occurs once in file2, at the first segment position (310). By deduplicating segments the segment fp1, referred uniquely by its fingerprint fp1, need only be stored once even though it is referenced three times by file1 and file2.

Container manager 204 thus stores segments to container 1 (312), container 2 (314), and so on. In this particular example, segment fp1 is stored in container 1 (312). After some time files are deleted (including file1 and file2) such that segment fp1 (316), segment fp2 (318) and segment fp5 (320) are no longer alive. The segment fp3, segment fp6 and segment fp7 are still alive, because they are referenced by other alive files.

If container 2 (320) has not been deleted and/or through garbage collection, any segment may be "undeleted" meaning a once-alive segment may be once-again-referenced by undeleting its associated file. In some embodiments a user, system and/or administrator may initiate the 'undelete' process. After the undelete process segment fp5 (322) is now available for indexing/reference again.

Figure 4:
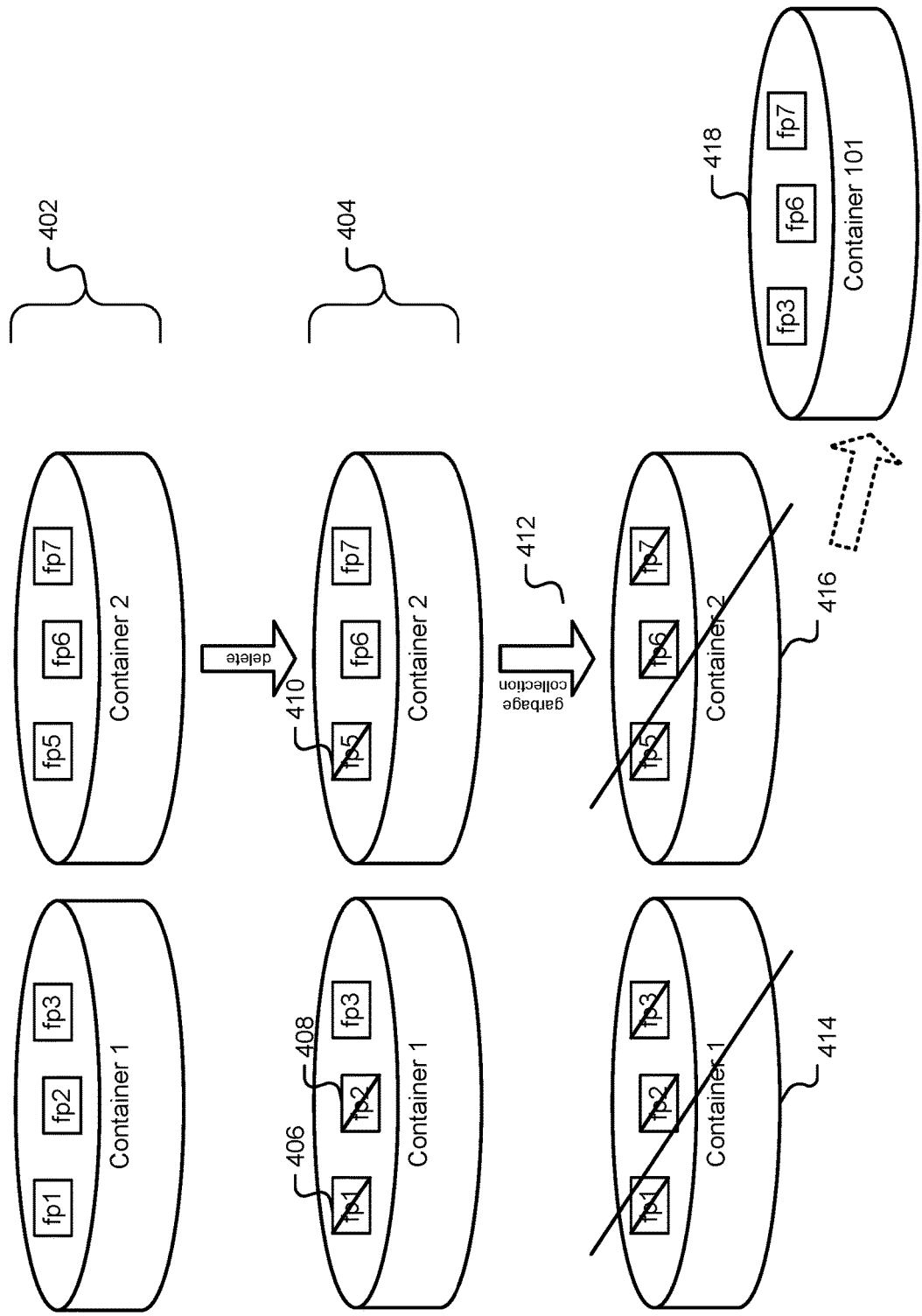
FIG. 4 is a diagram illustrating an embodiment of a process for garbage collection and deleting containers.

FIG. 4 is a diagram illustrating an embodiment of a process for garbage collection and deleting containers. In some embodiments, the process in FIG. 4 may be established by the system in FIG. 2.

Similar to containers (312) and (314), at stage (402) two containers are shown with alive segments fp1, fp2, and fp3 for container 1 and fp5, fp6, and fp7 for container 2. After file deletion (404) the segments fp1 (406), fp2 (408), and fp5 (410) are deleted and no longer alive. After some time garbage collection (412) is initiated. The garbage collector (206) and/or container manager (204) determine to consolidate the container 1 (414) and container 2 (416) into a new alive container 101 (418) with the remaining alive segments fp3, fp6, and fp7.

If container 1 (414) and container 2 (416) are put into a delete state, the segments while still physical stored, are no longer referenced and cannot be restored. Further, in a delete state the containers may be physically deleted and disk space reclaimed and overwritten at any time.

By contrast, if container 1 (414) and container 2 (416) are put into a delete-ready state, the segments are then put into a state that are no longer referenced but may be restored with administrator-level tools, for example an "undelete containers" routine, widget, applet or program. Furthermore in one embodiment the container manager (204) keeps track of when containers (414) (416) are placed into delete-ready state such that a FIFO or near-FIFO sequence is maintained. That is, if container 2 (416) was put in a delete-ready state last, it will also be nearly the last container to be physically deleted and its disk space reclaimed.

FIGS. 5A and 5B are flow diagrams illustrating embodiments of container states. In one embodiment, the container states shown in FIG. 5A and/or FIG. 5B are maintained by the container manager (204).

In FIG. 5A, an alive container (502), for example container 1 (312) or (402) after garbage collection (206) is placed into a delete state (504). In this delete state (504) the container may be physically deleted at any time and disk space reclaimed for reuse (506).

By contrast, in FIG. 5B, an live container (552) after garbage collection (206) is placed into a delete-ready state (554). Throughout this specification a "delete-ready" state (554) is a state indicating the container is ready for deletion but is not yet reclaimable, and that records in any form of metadata when the container was placed in said delete-ready state, for example for FIFO or near-FIFO sequencing of physical deletion and/or reclamation of disk space.

The container remains in its delete-ready state (554) until a trigger (556) is reached. In one embodiment the trigger is based both on a need for disk space and that the delete-ready container has been sequenced, based on when it was placed in a delete-ready state, for physical deletion. For example, the trigger (556) is based on a FIFO or near-FIFO sequencing of all the delete-ready containers.

In one embodiment the trigger (556) is based on sequencing the delete-ready container, based on the location of the delete-ready container and when it was placed in a delete-ready state, for physical deletion. For example, the trigger is based on a near-FIFO sequencing, which comprises a FIFO sequencing of all the delete-ready containers tempered by consideration of whether a delete-ready container is nearby to another delete-ready container to promote a contiguous disk space to be reclaimed. Throughout this specification "near-FIFO" refers to any combination of considering 1) the FIFO sequencing of instances when a container is placed in a delete-ready state; and 2) the location of the delete-ready container in proximity to other delete-ready containers.

After trigger (556) is reached, the container is placed in a delete state (558), analogous to state (504), and available for reclamation (560), analogous to state (506).

Figure 6:
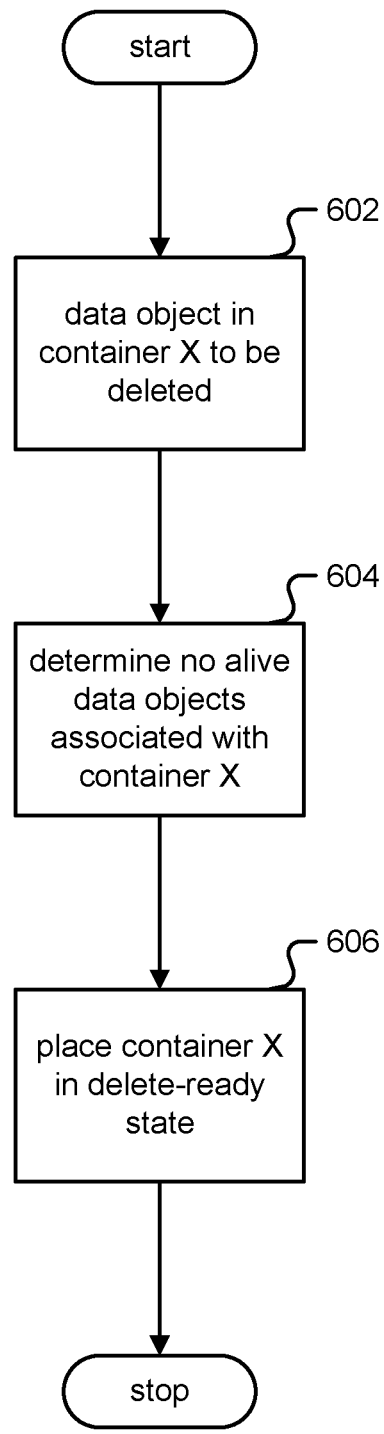
FIG. 6 is a flow chart illustrating an embodiment of a process for putting a container in a delete-ready state.

FIG. 6 is a flow chart illustrating an embodiment of a process for putting a container in a delete-ready state. In one embodiment, the process of FIG. 6 is performed by container manager (204) and/or garbage collector (206).

In step 602, an indication is received that a data object is to be deleted, wherein the data object comprises data stored in a segment within a container. In one embodiment the data object is a file. In step 604, the garbage collector (206) and/or container manager (204) determines that no currently alive data object references any segment within the container. In step 606, a container manager (204) places the container in a delete-ready state but not yet reclaimable state.

Figure 7:
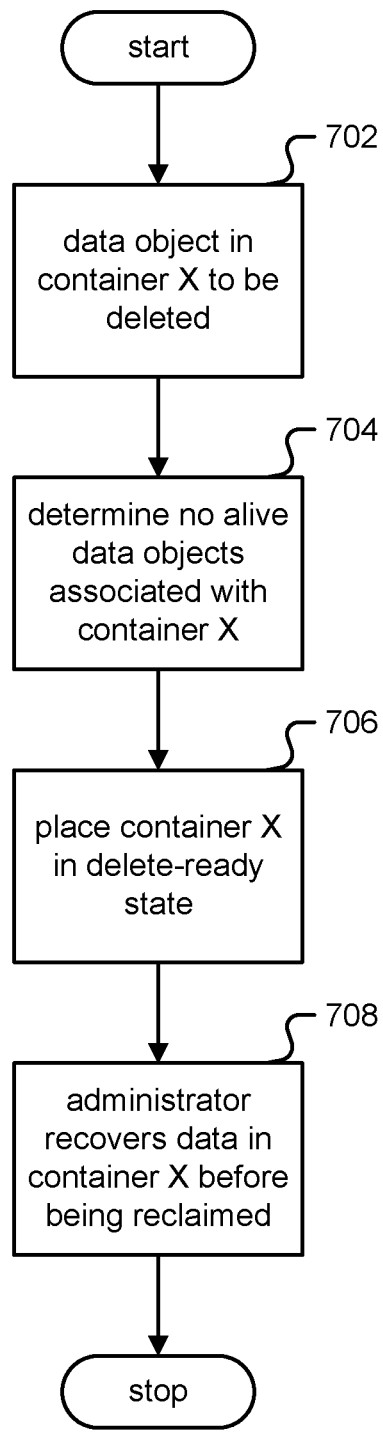
FIG. 7 is a flow chart illustrating an embodiment of a process for recovering data.

FIG. 7 is a flow chart illustrating an embodiment of a process for recovering data. In one embodiment, the process of FIG. 7 is performed by container manager (204) and/or garbage collector (206).

Similar to FIG. 6, in step 702, an indication is received that a data object is to be deleted, wherein the data object comprises data stored in a segment within a container. In one embodiment the data object is a file. In step 704, the garbage collector (206) and/or container manager (204) determines that no currently alive data object references any segment within the container. In step 706, a container manager (204) places the container in a delete-ready state but not yet reclaimable state. In step 708, an administrator using an administrator-level tool can even after garbage collection (206) recover data off said delete-ready container before the delete-ready container trigger (556) is reached and disk space reclaimed.

Figure 8:
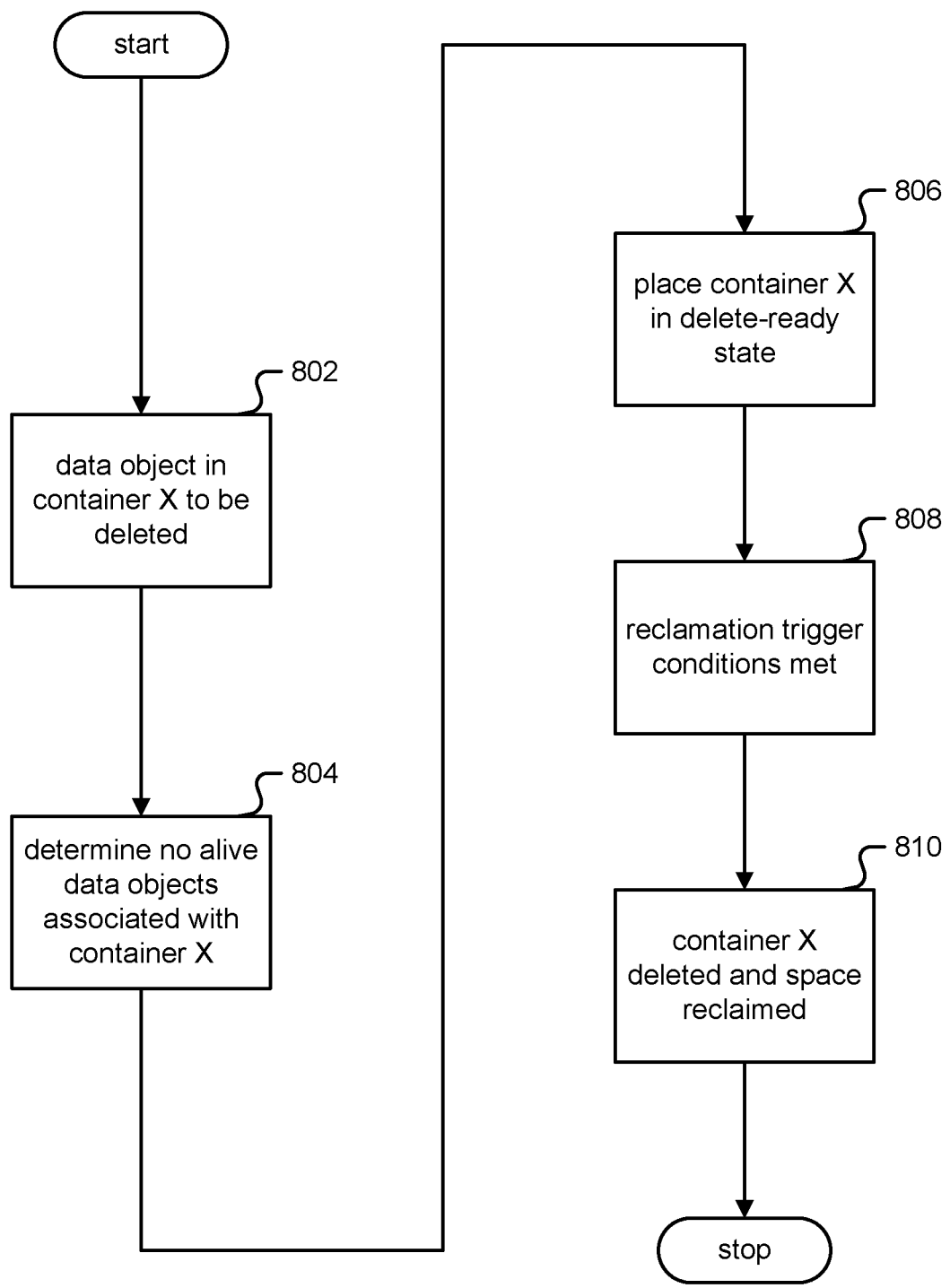
FIG. 8 is a flow chart illustrating an embodiment of a process for reclaiming disk space.

FIG. 8 is a flow chart illustrating an embodiment of a process for reclaiming disk space. In one embodiment, the process of FIG. 8 is performed by container manager (204) and/or garbage collector (206).

Similar to FIG. 6, in step 802, an indication is received that a data object is to be deleted, wherein the data object comprises data stored in a segment within a container. In one embodiment the data object is a file. In step 804, the garbage collector (206) and/or container manager (204) determines that no currently alive data object references any segment within the container. In step 806, a container manager (204) places the container in a delete-ready state but not yet reclaimable state. In step 808, the delete-ready container trigger (556) is reached and in step 810 the container is deleted and associated disk space reclaimed.

Figure 9A:
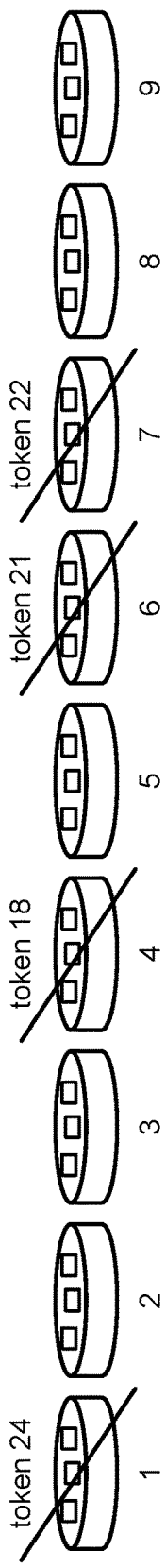
FIGS. 9A, 9B, and 9C illustrate examples of using tokens for data recovery.
Figure 9B:
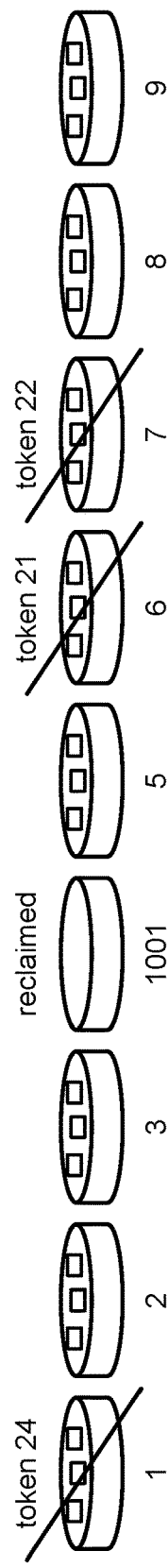
Figure 9C:
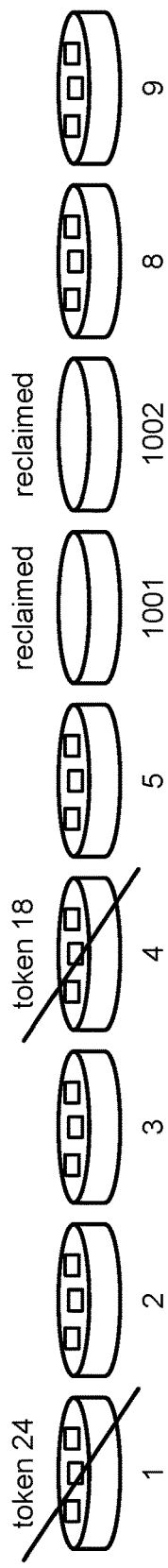

FIGS. 9A, 9B, and 9C illustrate examples of using tokens for data recovery.

In FIG. 9A, nine containers with container ID's 1 through 9 are shown after a round of use, file deletion and garbage collection. As containers are placed in a delete-ready state they are assigned in metadata a "token", defined throughout this specification as a metadata sequence counter of when containers are placed in a delete-ready state. For example as shown in FIG. 9A:

container 4 was placed in a delete-ready state with token 18; then
other (not shown) containers were placed in a delete-ready state for tokens 19-20; then
container 6 was placed in a delete-ready state with token 21; then
container 7 was placed in a delete-ready state with token 22; then
another (not shown) container was placed in a delete-ready state with token 23; then
container 1 was placed in a delete-ready state with token 24.

As can be seen in FIG. 9A, the containers may be placed in a delete-ready state in any order independently of the container ID. In other systems where LIFO or other sequencing is inadvertently followed and there is no delete-ready state, the container 1 which was deleted last is reclaimed first, wiping out the freshest data to the user's disadvantage.

By contrast, with the introduction of the delete-ready state and using tokens, a container manager (204) may elect to use either FIFO sequencing or near FIFO-sequencing, depicted in FIGS. 9B and 9C, respectively.

In FIG. 9B, the container manager (204) uses a strict FIFO sequencing to reclaim the oldest delete-ready container 4, reclaiming the associated disk space and establishing a new container 1001 in place of deleted container 4. The container manager (204) can determine the oldest delete-ready container using the smallest token, in this case token 18. After the container 4 is placed in the delete state the token 18 may then be consumed.

In FIG. 9C, the container manager (204) relaxes the FIFO sequencing to recognize that younger delete-ready containers 6 and 7 are contiguous, and instead elects to reclaim those containers. New containers 1001 and 1002 are established in place of deleted containers 6 and 7.

Figure 10A:
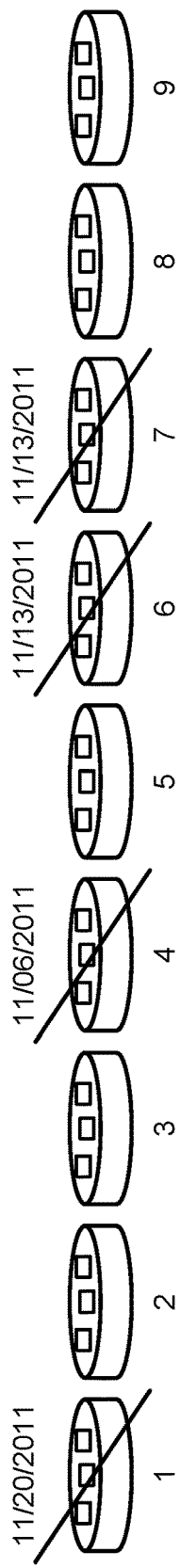
FIGS. 10A, 10B, and 10C illustrate examples of using delete times for data recovery.
Figure 10B:
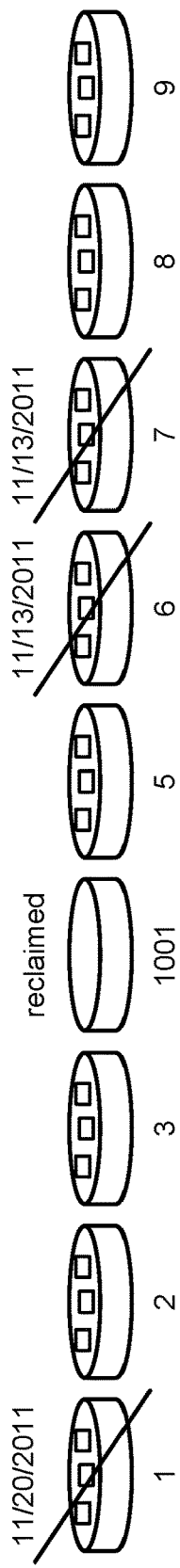
Figure 10C:
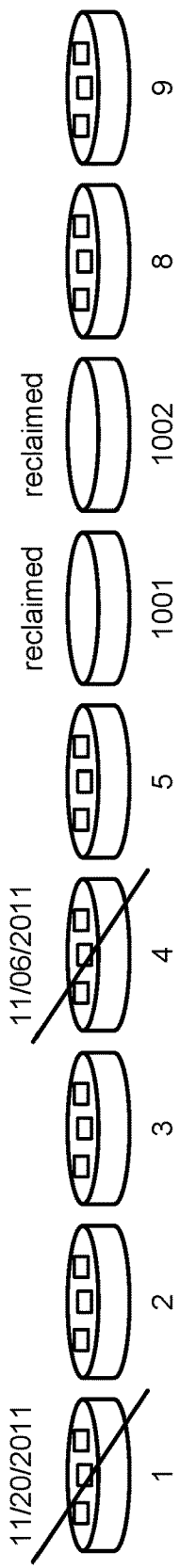

FIGS. 10A, 10B, and 10C illustrate examples of using delete times for data recovery.

Apart from tokens, any metadata the records when a container is placed in a delete-ready state may be used. Similar to FIG. 9A, in FIG. 10A nine containers with container ID's 1 through 9 are shown after a round of use, file deletion and garbage collection. As containers are placed in a delete-ready state they are assigned in metadata a "delete time", defined throughout this specification as a metadata recordation of when containers are placed in a delete-ready state. The delete time may be recorded as a date, a time, a date and time combination, a sequence, a time since an epoch, etc. For example as shown in FIG. 10A:

container 4 was placed in a delete-ready state during the 11/06/2011 garbage collection; then
containers 6 and 7 were placed in a delete-ready state during the 11/13/2011 garbage collection; then
container 1 was placed in a delete-ready state during the 11/20/2011 garbage collection.

As can be seen in FIG. 10A, the containers may be placed in a delete-ready state in any order independently of the container ID. In other systems where LIFO or other sequencing is inadvertently followed and there is no delete-ready state, the container 1 which was deleted last is reclaimed first, wiping out the freshest data to the user's disadvantage.

By contrast, with the introduction of the delete-ready state and using tokens, a container manager (204) may elect to use either FIFO sequencing or near FIFO-sequencing, depicted in FIGS. 10B and 10C, respectively.

In FIG. 10B, the container manager (204) uses a strict FIFO sequencing to reclaim the oldest container 4, reclaiming the associated disk space and establishing a new container 1001 in place of deleted container 4.

In FIG. 10C, the container manager (204) relaxes the FIFO sequencing to recognize that younger delete-ready containers 6 and 7 are contiguous, and instead elects to reclaim those containers. New containers 1001 and 1002 are established in place of deleted containers 6 and 7.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method performed by a storage system having a processor and a memory, the method comprising:

receiving, by one or more processors of a container manager of the storage system, an indication that a data object is to be deleted, wherein the data object comprises data stored in a segment within a container;

determining, by the one or more processors of the container manager, no currently alive data object references any segment within the container, wherein an alive data object refers to a data object being actively used or stored by a user of the storage system;

if no currently alive data object being actively used or stored by a user of the storage system references any segment within the container, placing, by the one or more processors of the container manager, the container in a delete-ready but not yet reclaimable state, wherein unreferenced data in the container in the delete-ready but not yet reclaimable state can still be recovered by a segment fingerprint as a key, such that a once-alive data object associated with the unreferenced data in the container in the delete-ready but not yet reclaimable state can be undeleted, the undeleting comprising once-again-referencing the unreferenced data;

recording, by the one or more processors of the container manager, metadata reflecting an order in which the container was placed in the delete-ready state relative to one or more other containers being placed in the delete-ready state;

receiving, by the one or more processors of the container manager, an indication that a trigger event to reclaim storage space has occurred; and changing, by the one or more processors of the container manager, the container from the delete-ready state to a reclaimable state based at least in part on the trigger event and the metadata reflecting the order in which the container was placed in the delete-ready state.

2. The method of claim 1, where each segment is immutable and unique.

3. The method of claim 1, where each container is stored in a deduplicating file system.

4. The method of claim 1, further comprising associating a token with the container when placing the container in the delete-ready state.

5. The method of claim 4, further comprising determining an earliest deleted container amongst a plurality of containers in the delete-ready state in part by determining which container has a smallest token.

6. The method of claim 5, further comprising receiving a second indication that at least one container must be deleted, and determining to delete the earliest deleted container to maintain a FIFO order.

7. The method of claim 5, further comprising receiving a second indication that at least one container must be deleted, and determining to delete a specific container based at least upon: (1) the token with each container in the delete-ready state; and (2) a position of each container in the delete-ready state.

8. The method of claim 5, further comprising receiving a second indication that at least one container must be deleted, and determining to delete a specific container based at least upon: (1) a FIFO order based on the token associated with each container in the delete-ready state; and (2) a position of each container in the delete-ready state in relation to contiguous areas in a file system.

9. The method of claim 1, wherein the metadata comprises a delete time associated with when the container is placed in the delete-ready state.

10. The method of claim 9, further comprising receiving a second indication that at least one container must be deleted, and determining to delete a specific container based at least upon the delete time associated with each container in the delete-ready state.

11. The method of claim 9, further comprising receiving a second indication that at least one container must be deleted, and determining to delete a specific container based at least upon a FIFO ordering based on the delete time associated with each container in the delete-ready state.

12. The method of claim 9, further comprising receiving a second indication that at least one container must be deleted, and determining to delete a specific container based at least upon: (1) the delete time associated with each container in the delete-ready state; and (2) a position of each container in the delete-ready state.

13. The method of claim 9, further comprising receiving a second indication that at least one container must be deleted, and determining to delete a specific container based at least upon: (1) a FIFO ordering based on the delete time associated with each container in the delete-ready state; and (2) a position of each container in the delete-ready state in relation to contiguous areas in a file system.

14. The method of claim 1, further comprising receiving a second indication that a reclamation criteria is met and taking the container out of the delete-ready state.

15. A system, comprising:
one or more processors; and
a memory coupled with the one or more processors, wherein the memory is configured to provide the one or more processors with instructions which when executed cause the processor to:
receive, by the one or more processors, an indication that a data object is to be deleted, wherein the data object comprises data stored in a segment within a container;
determine, by the one or more processors, no currently alive data object references any segment within the container, wherein an alive data object refers to a data object being actively used or stored by a user of the storage system;
if no currently alive data object being actively used or stored by a user of the storage system references any segment within the container, place, by the one or more processors, the container in a delete-ready but not yet reclaimable state, wherein unreferenced data in the container in the delete-ready but not yet reclaimable state can still be recovered by a segment fingerprint as a key, such that a once-alive data object associated with the unreferenced data in the container in the delete-ready but not yet reclaimable state can be undeleted, the undeleting comprising once-again-referencing the unreferenced data;
record, by the one or more processors, metadata reflecting an order in which the container was placed in the delete-ready state relative to one or more other containers being placed in the delete-ready state;
receive, by the one or more processors, an indication that a trigger event to reclaim storage space has occurred; and
change, by the one or more processors, the container from the delete-ready state to a reclaimable state based at least in part on the trigger event and the metadata reflecting the order in which the container was placed in the delete-ready state.

16. The system recited in claim 15, wherein the processor is further configured to associate a token with the container when placing the container in the delete-ready state.

17. The system recited in claim 15, wherein the metadata comprises a delete time associated with when the container is placed in the delete-ready state.

18. A computer program product, the computer program product being embodied in a tangible computer readable storage medium and comprising computer instructions for:
receiving, by one or more processors of a container manager of a storage system, an indication that a data object is to be deleted, wherein the data object comprises data stored in a segment within a container;
determining, by the one or more processors of the container manager, no currently alive data object references any segment within the container, wherein an alive data object refers to a data object being actively used or stored by a user of the storage system;
if no currently alive data object being actively used or stored by a user of the storage system references any segment within the container, placing, by the one or more processors of the container manager, the container in a delete-ready but not yet reclaimable state, wherein unreferenced data in the container in the delete-ready but not yet reclaimable state can still be recovered by a segment fingerprint as a key, such that a once-alive data object associated with the unreferenced data in the container in the delete-ready but not yet reclaimable state can be undeleted, the undeleting comprising once-again-referencing the unreferenced data;
recording, by the one or more processors of the container manager, metadata reflecting an order in which the container was placed in the delete-ready state relative to one or more other containers being placed in the delete-ready state;
receiving, by the one or more processors of the container manager, an indication that a trigger event to reclaim storage space has occurred; and
changing, by the one or more processors of the container manager, the container from the delete-ready state to a reclaimable state based at least in part on the trigger event and the metadata reflecting the order in which the container was placed in the delete-ready state.

19. The computer program product recited in claim 18, further comprising computer instructions for: associating a token with the container when placing the container in the delete-ready state.

20. The computer program product recited in claim 18, wherein the metadata comprises a delete time associated with when the container is placed in the delete-ready state.

* * * * *